(12) United States Patent
Lee et al.

(10) Patent No.: US 10,341,747 B2
(45) Date of Patent: *Jul. 2, 2019

(54) SYSTEM AND METHOD FOR WAVELENGTH CONVERSION AND SWITCHING

(71) Applicant: Futurewei Technologies, Inc., Plano, TX (US)

(72) Inventors: Young Lee, Plano, TX (US); Greg Bernstein, Fremont, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/401,553

(22) Filed: Jan. 9, 2017

(65) Prior Publication Data
US 2017/0118546 A1 Apr. 27, 2017

Related U.S. Application Data

(63) Continuation of application No. 14/579,776, filed on Dec. 22, 2014, now Pat. No. 9,571,223, which is a continuation of application No. 12/042,933, filed on Mar. 5, 2008, now abandoned.
(Continued)

(51) Int. Cl.
*H04J 14/02* (2006.01)
*H04Q 11/00* (2006.01)
(Continued)

(52) U.S. Cl.
CPC ........ *H04Q 11/0062* (2013.01); *H04J 14/025* (2013.01); *H04J 14/0212* (2013.01);
(Continued)

(58) Field of Classification Search
CPC ... H04J 14/0227; H04J 14/0246; H04J 14/025
See application file for complete search history.

(56) References Cited

U.S. PATENT DOCUMENTS 6,122,538 A 9/2000 Sliwa, Jr. et al.
6,449,070 B1 9/2002 Izumi
(Continued)

FOREIGN PATENT DOCUMENTS

CN 1151625 A 5/2004
CN 1878047 A 12/2006
(Continued)

OTHER PUBLICATIONS

Farrel et al., "A Path Computation Element (PCE)-Based Architecture", IETF RFC-4655, Aug. 2006.*
(Continued)

*Primary Examiner* — Shi K Li
(74) *Attorney, Agent, or Firm* — Conley Rose, P.C.

(57) ABSTRACT

A network component comprising at least one processor configured to implement a method comprising collecting wavelength availability information associated with a wavelength switched optical network (WSON), receiving a path computation request to transport a signal through the WSON, calculating at least one route through the WSON for the signal, and assigning at least one wavelength for the signal to use along the route. Also disclosed is a network comprising a first path computation element (PCE) configured to compute at least one route for a signal between a source and a destination, and a second PCE in communication with the first PCE, wherein the second PCE is configured to receive the route from the first PCE and assign at least one wavelength to the route.

19 Claims, 4 Drawing Sheets

Related U.S. Application Data

(60) Provisional application No. 60/940,892, filed on May 30, 2007.

(51) Int. Cl.
    *H04L 12/701*     (2013.01)
    *H04L 12/721*     (2013.01)
    *H04L 12/751*     (2013.01)
    *H04L 12/723*     (2013.01)

(52) U.S. Cl.
CPC ...... *H04J 14/0227* (2013.01); *H04J 14/0246* (2013.01); *H04L 45/00* (2013.01); *H04L 45/02* (2013.01); *H04L 45/50* (2013.01); *H04L 45/62* (2013.01); *H04Q 11/0005* (2013.01); *H04J 14/021* (2013.01); *H04J 14/0213* (2013.01); *H04J 14/0284* (2013.01); *H04Q 2011/0016* (2013.01); *H04Q 2011/0058* (2013.01); *H04Q 2011/0073* (2013.01); *H04Q 2011/0079* (2013.01); *H04Q 2011/0086* (2013.01)

(56) References Cited

U.S. PATENT DOCUMENTS

| | | | |
|---|---|---|---|
| 6,738,354 | B1 | 5/2004 | Ashwood Smith |
| 7,054,557 | B1 | 5/2006 | Dasylva et al. |
| 7,243,160 | B2* | 7/2007 | Brahmaroutu ......... H04L 45/02 370/237 |
| 7,716,271 | B1 | 5/2010 | Bertsekas et al. |
| 9,300,428 | B2 | 3/2016 | Bernstein et al. |
| 9,571,223 | B2* | 2/2017 | Lee ..................... H04J 14/0227 |
| 2003/0026297 | A1 | 2/2003 | Nagarajan et al. |
| 2003/0161632 | A1 | 8/2003 | Wang |
| 2004/0141463 | A1* | 7/2004 | Acharya ............... H04L 45/04 370/238 |
| 2004/0190896 | A1* | 9/2004 | Terahara ............ H04J 14/0208 398/5 |
| 2004/0190900 | A1 | 9/2004 | Yagyu |
| 2004/0264960 | A1 | 12/2004 | Maciocco et al. |
| 2005/0013259 | A1* | 1/2005 | Papoushado ........ H04L 41/0806 370/254 |
| 2006/0002716 | A1 | 1/2006 | Guy et al. |
| 2007/0009204 | A1 | 1/2007 | Ducellier et al. |
| 2007/0212067 | A1 | 9/2007 | Miyazaki et al. |
| 2008/0074732 | A1* | 3/2008 | Stephens ............ H04B 10/2933 359/334 |
| 2008/0205293 | A1 | 8/2008 | Mitra et al. |
| 2009/0296719 | A1* | 12/2009 | Maier .................... H04L 45/12 370/400 |
| 2009/0304380 | A1* | 12/2009 | Sadananda ......... H04Q 11/0062 398/26 |
| 2010/0086306 | A1 | 4/2010 | D'Alessandro et al. |

FOREIGN PATENT DOCUMENTS

| | | |
|---|---|---|
| WO | 2006008460 A1 | 1/2006 |
| WO | 2008011770 A1 | 1/2008 |

OTHER PUBLICATIONS

Zang, H., et al., "A Review of Routing and Wavelength Assignment Approaches for Wavelength-Routed Optical WDM Networks," Aug. 13, 1999, 25 pages.
Bernstein, G, et al., "Modeling WDM Wavelength Switching Systems for Use in GMPLS and Automated Path Computations," Journal of Optical Communications and Networking, vol. 1, Jun. 2009, 24 pages.
Yang, X., et al., "Dynamic Routing in Translucent WDM Optical Networks: The Intradomain Case," Journal of Lightwave Technology, vol. 23, Mar. 2005, pp. 955-971.
Bernstein, G., et al., "A WSON GMPLS Model for Signal Compatibility and Switching Systems including Wavelength Converters and Regenerators," http://www.grotto-networking.com/sites/default/files/ModelingSwitchesConvertersRegensV02f_0.pdf, Jun. 2008, 7 pages.
"Series G: Transmission Systems and Media, Digital Systems and Networks, Transmission media characteristics—Optical fibre cables, Characteristics of a single-mode-optical fibre and cable," ITU-T, G.652, Jun. 2005, 20 pages.
"Series G: Transmission Systems and Media, Digital Systems and Networks, Transmission media characteristics—Optical fibre cables, Characteristics of a dispersion-shifted single-mode optical fibre and cable," ITU-T, G.653, Dec. 2006, 20 pages.
"Series G: Transmission Systems and Media, Digital Systems and Networks, Transmission media characteristics—Optical fibre cables, Characteristics of a cut-off shifted single-mode optical fibre and cable," ITU-T, G.654, Dec. 2006, 20 pages.
"Series G: Transmission Systems and Media, Digital Systems and Networks, Transmission media characteristics—Optical fibre cables, Characteristics of a non-zero dispersion-shifted single-mode optical fibre and cable," ITU-T, G.655, Mar. 2006, 23 pages.
"Series G: Transmission Systems and Media, Digital Systems and Networks, Transmission media characteristics—Optical fibre cables," ITU-T, G.656, Dec. 2006, 18 pages.
"Series G: Transmission Systems and Media, Digital Systems and Networks, Transmission media characteristics—Characteristics of optical components and subsystems, Spectral grids for WDM applications: DWDM frequency grid," ITU-T, G.694.1, Jun. 2002, 11 pages.
"Series G: Transmission Systems and Media, Digital Systems and Networks, Transmission media characteristics—Characteristics of optical components and subsystems, Spectral grids for WDM applications: CWDM wavelength grid," ITU-T, G.694.2, Dec. 2003, 10 pages.
"Series G: Transmission Systems and Media, Digital Systems and Networks, Digital sections and digital line system—Digital line systems, Optical transport network physical layer interfaces," ITU-T, G.959.1, Mar. 2006, 57 pages.
"Erratum 1," Covering Note, Nov. 7, 2006, 1 page.
"Series G: Transmission Systems and Media, Digital Systems and Networks, Transport of IEEE 10G Base-R in Optical Transport Networks (OTN)" Telecommunication Standardization Sector of ITU, Series G, Supplement 43, Nov. 2006, 15 pages.
"Series G: Transmission Systems and Media, Digital Systems and Networks, Architecture of optical transport networks," ITU-T, G.872, Nov. 2001, 72 pages.
"Series G: Transmission Systems and Media, Digital Systems and Networks, Optical system design and engineering considerations," ITU-T, Series G, Supplement 39, Dec. 2008, 106 pages.
"Series G: Transmission Systems and Media, Digital Systems and Networks, Transmission media characteristics—Characteristics of optical components and subsystems, Transmission Characteristics of optical components and subsystems," ITU-T, G.671, Jan. 2005, 42 pages.
"Series G: Transmission Systems and Media Digital Systems and Networks, Transmission media and optical systems characteristics—Characteristics of optical systems, Multichannel DWDM applications with single-channel optical interfaces," ITU-T, G.698.1, Dec. 2006, 32 pages.
"Series G: Transmission Systems and Media, Digital Systems and Networks, Transmission media and optical systems characteristics—Characteristics of optical systems, Amplified multichannel DWDM applications with single channel optical interfaces," ITU-T, G.698.2, Jul. 2007, 34 pages.
"Series G: Transmission Systems and Media, Digital Systems and Networks, Digital terminal equipments—General, Series Y: Global Information Infrastructure, internet Protocol Aspects and Next-Generation Networks, Internet protocol aspects—Transport, Network node interface for the synchronous digital hierarchy (SDH)," ITU-T, G.707/Y.1322, Jan. 2007, 196 pages.
"Series G: Transmission Systems and Media, Digital Systems and Networks, Digital terminal equipments—General, Series Y: Global Information Infrastructure, Internet Protocol Aspects and Next Generation Networks, Internet protocol aspects—Transport, Interfaces for the optical Transport Network (OTN)," ITU-T, G.709/Y.1331, Mar. 2003, 118 pages.

(56) References Cited

OTHER PUBLICATIONS

Sengupta, S., et al., "Analysis of Enhanced OSPF for Routing Lightpaths in Optical Mesh Networks," Proceedings of IEEE International Conference on Communications, vol. 5, Apr. 28, 2002, pp. 2865-2869.

Ozdaglar, A., et al., "Routing and Wavelength Assignment in Optical Networks," IEEE/ACM Transactions on Networking, vol. 11, Apr. 2003, pp. 259-272.

Sambo, N., et al., "GMPLS-Controlled Dynamic Translucent Optical Networks," IEEE Network, May/Jun. 2009, pp. 34-40.

Sen, A., et al., "On Sparse Placement of Regenerator Nodes in Translucent Optical Networks," IEEE Globecom, 2008, pp. 1-6.

Shen, G. et al. "Translucent Optical Networks: The Way Forward," Topics in Optical Communications, IEEE Communications Magazine, Feb. 2007, pp. 48-54.

Al-Fuqaha, A., et al., "Routing in All-Optical DWDM Networks with Sparse Wavelength Conversion Capabilities," GLOBECOM'03— IEEE Global Telecommunications Conference Proceedings, vol. 5, Dec. 1, 2003, pp. 2569-2574.

Dutta, R., et al., "Traffic Grooming in WDM Networks: Past and Future," IEEE Network, Nov./Dec. 2002, 11 pages.

Coldren, L., et al., "Tunable Semiconductor Lasers: A Tutorial," Journal of Lightwave Technology, vol. 22, No. 1, Jan. 2004, pp. 193-202.

Chu, X., et al., "Wavelength Converter Placement Under Different RWA Algorithms in Wavelength-Routed All-Optical Networks," IEEE Transactions on Communications, vol. 51, No. 4, Apr. 2003, pp. 607-617.

Buus, J., et al., "Tunable Lasers in Optical Networks," Journal of Lightwave Technology, vol. 24, No. 1, Jan. 2006, pp. 5-11.

Basch, B., et al., "Architectural Tradeoffs for Reconfigurable Dense Wavelength-Division Multiplexing Systems," IEEE Journal of Slected Topics in Quantum Electronics, vol. 12, No. 4, Jul./Aug. 2006, pp. 615-626.

Vasseur, JP. Ed., et al., "Path Computation Element (PCE) Communication Protocol (PCEP)," draft-ietf-pce-pcep-07.txt, Mar. 2, 2007, 70 pages.

Vasseur, JP. Ed., et al., "OSPF Protocol Extensions for Path Computation Element (PCE) Discovery," draft-ietf-pce-disco-proto-ospf-04.txt, May 2007, 23 pages.

Vasseur, JP. Ed., et al., "Path Computation Element (PCE) Communication Protocol (PCEP)," draft-ietf-pce-pcep-19.txt, Nov. 17, 2008, 91 pages.

Bernstein, G, et al., "Routing and Wavelength Assignment Information for Wavelength Switched Optical Networks," draft-bernstein-cramp-wson-info-02.txt, Feb. 20, 2008, 48 pages.

Le Roux, J.L., Ed., et al., "Encoding of Objective Functions in Path Computation Element (PCE)," draft-ietf-pce-of-05.txt, Feb. 2008, 19 pages.

Le Roux, J.L., Ed., et al., "OSPF Protocol Extensions for Path Computation Element (PCE) Discovery," draft-ietf-pce-disco-proto-ospf-03.txt, Apr. 2007, 23 pages.

Le Roux, J.L., Ed., et al., "OSPF Protocol Extensions for Path Computation Element (PCE) Discovery," draft-ietf-pce-disco-proto-ospf-05.txt, May 2007, 23 pages.

Le Roux, J.L., Ed., et al., "OSPF protocol extensions for Path Computation Element (PCE) Discovery," draft-ietf-pce-disco-proto-ospf-07.txt, Sep. 2007, 21 pages.

Lee, Y., et al., "Path Computation Element Communication Protocol (PCECP) Requirements and Protocol Extensions in Support of Global Concurrent Optimization," draft-lee-pce-global-concurrent-optimization-04.txt, May 29, 2007, 32 pages.

Otani, T., et al., "Generalized Labels of Lambda-Switching Capable Label Switching Routers (LSR)," draft-otani-ccamp-gmpls-lambda-labels-02.txt, Feb. 24, 2008, 11 pages.

Otani, T., et al., "Generalized Labels of Lambda-Switching Capable Label Switching Routers (LSR)," IETF Internet Draft, draft-otani-ccamp-gmpls-lambda-labels-00.txt, Jun. 2007, 11 pages.

Vasseur, JP., Ed., et al., "Path Computation Element (PCE) Communication Protocol (PCEP)," draft-ietf-pce-pcep-08.txt, Jul. 5, 2007, 64 pages.

Vasseur, JP. Ed., et al., "Path Computation Element (PCE) Communication Protocol (PCEP)," draft-ietf-pce-pcep-11.txt, Mar. 15, 2008, 77 pages.

Le Roux, J.L., et al., "Encoding of Objective Functions in Path Computation Element (PCE) Communication protocol (PCEP)," draft-ietf-pce-of-01.txt, Nov. 2007, 20 pages.

Le Roux, J.L., et al., "Encoding of Objective Functions in Path Computation Element (PCE) Communication and Discovery Protocols," draft-leroux-pce-of-00.txt, Mar. 2007, 18 pages.

Shiomoto, K., et al., "Requirements for GMPLS-Based Multi-Region and Multi-Layer Networks (MRN/MLN)," draft-ietf-ccamp-gmpls-mln-reqs-03.txt, Apr. 2007, 24 pages.

Shiomoto, K., et al., "Requirements for GMPLS-Based Multi-Region and Multi-Layer Networks (MRN/MLN)," draft-ietf-ccamp-gmpls-mln-reqs-08.txt, Jan. 2008, 29 pages.

Lee., Y., et al., "PCEP Requirements for WSON Routing and Wavelength Assignment," draft-lee-pce-wson-routing-wavelength-01.txt, Feb. 18, 2008, 19 pages.

Le Roux, J.L., et al., "Encoding of Objective Functions in Path Computation Element Communication Protocol (PCEP)," draft-ietf-pce-of-02.txt, Mar. 2008, 18 pages.

Lee, Y., et al., "Path Computation Element Communication Protocol (PCEP) Requirements and Protocol Extensions in Support of Global Concurrent Optimization," draft-ietf-pce-global-concurrent-optimization-02.txt, Feb. 21, 2008, 31 pages.

Lee, Y., et al.,"Path Computation Element Communication Protocol (PCECP) Requirements and Protocol Extensions in Support of Global Concurrent Optimization," Network Working Group; Internet-Draft, draft-ietf-pce-global-concurrent-optimization-00.txt, Jun. 22, 2007, 31 pages.

Imajuku, W., et al., "Routing Extensions to Support Network Elements with Switching Constraint," draft-imajuku-ccamp-rtg-switching-constraint-01.txt, Oct. 23, 2006, 8 pages.

Imajuku, W., et al., "Routing Extensions to Support Network Elements with Switching Constraint," draft-imajuku-ccamp-rtg-switching-constraint-02.txt, Jul. 2007, 8 pages.

Fang, L., Ed., "Security Framework for MPLS and GMPLS Networks," draft-ietf-mpls-mpls-and-gmpls-security-framework-02.txt, Feb. 2008, 63 pages.

Oki, E., et al., "Requirements of Optical Link-State Information for Traffic Engineering," draft-oki-ipo-optlink-req-00.txt, Feb. 2002, 8 pages.

Bradner, S., "Key words for use in RFCs to Indicate Requirement Levels," RFC 2119, Mar. 1997, 3 pages.

Katz, D., et al., "Traffic Engineering (TE) Extensions to OSPF Version 2," RFC 3630, Sep. 2003, 15 pages.

Mannie, E., Ed., "Generalized Multi-Protocol Label Switching (GMPLS) Architecture," RFC 3945, Oct. 2004, 70 pages.

Strand, J., Ed., et al., "Impairments and Other Constraints on Optical Layer Routing," RFC 4054, May 2005, 30 pages.

Kompella, K., et al., "Link Bundling in MPLS Traffic Engineering (TE)," RFC 4201, Oct. 2005, 13 pages.

Kompella, K., Ed., et al., "Routing Extensions in Support of Generalized Multi-Protocol Label Switching (GMPLS)," RFC 4202, Oct. 2005, 28 pages.

Kompella, K, Ed., "OSPF Extensions in Support of Generalized Multi-Protocol Label Switching (GMPLS)," RFC 4203, Oct. 2005, 10 pages.

Papadimitriou, D., Ed., "Generalized Multi-Protocol Label Switching (GMPLS) Signaling Extensions for G.709 Optical Transport Networks Control," RFC 4328, Jan. 2006, 24 pages.

Otani, T., et al., "Generalized Labels of Lambda-Switching Capable Label Switching Routers (LSR)," RFC 3471, Jun. 2007, 11 pages.

Le Roux, JL, Ed., et al., "OSPF Protocol Extensions for Path Computation Element (PCE) Discovery," RFC 5088, Jan. 2008, 21 pages.

Mannie, E., et al., "Generalized Multi-Protocol Label Switching (GMPLS) Extensions for Synchronous Optical Network (SONET) and Synchronous Digital Hierarchy (SDH) Control," RFC 4606, Aug. 2006, 26 pages.

(56) References Cited

OTHER PUBLICATIONS

Berger, L., Ed., "Generalized Multi-Protocol Label Switching (GMPLS) Signaling Resource ReserVation Protocol-Traffic Engineering (RSVP-TE) Extensions," RFC 3473, Jan. 2003, 43 pages.

Farrel, A., Ed, et al., "Encoding of Attributes for Multiprotocol Label Switching (MPLS) Label Switched Path (LSP) Establishment Using Resource Reservation Protocol—Traffic Engineering (RSVP-TE)," RFC 4420, Feb. 2006, 22 pages.

Farrel, A., et al., "A Path Computation Element (PCE)-Based Architecture," RFC 4655, Aug. 2006, 38 pages.

Ho, P., et al., "A Novel Distributed Control Protocol in Dynamic Wavelength-Routed Optical Networks," IEEE Communications Magazine, Nov. 2002, pp. 38-45.

Winzer, P., et al., "Advanced Optical Modulation Formats," Proceedings of the IEEE, vol. 94, No. 5, May 2006, pp. 952-985.

Foreign Communication From a Related Counterpart Application, European Application No. 08757539.5, European Office Action dated Jul. 9, 2012, 5 pages.

Foreign communication from a counterpart application, European application No. 08757539.5, Extended European Search Report dated Oct. 14, 2010, 7 pages.

Foreign Communication From a Related Counterpart Application—International Search Report, PCT/CN2008/071128, dated Sep. 11, 2008, 4 pages.

Foreign Communication From a Counterpart Application, PCT Application No. PCT/CN2008/071128, Written Opinion dated Sep. 11, 2008, 6 pages.

Office Action dated Jul. 13, 2011, 10 pages, U.S. Appl. No. 12/042,933, filed Mar. 5, 2008.

Office Action dated Mar. 16, 2011, 26 pages, U.S. Appl. No. 12/042,933, filed Mar. 5, 2008.

Office Action dated Apr. 18, 2014, 22 pages, U.S. Appl. No. 12/042,933, filed Mar. 5, 2008.

Office Action dated Aug. 18, 2014, 3 pages, U.S. Appl. No. 12/042,933, filed Mar. 5, 2008.

Office Action dated Sep. 25, 2014, 10 pages, U.S. Appl. No. 12/042,933, filed Mar. 5, 2008.

Office Action dated Sep. 29, 2011, 3 pages, U.S. Appl. No. 12/042,933, filed Mar. 5, 2008.

Office Action dated Feb. 4, 2011, 6 pages, U.S. Appl. No. 12/042,933, filed Mar. 5, 2008.

Office Action dated Apr. 8, 2016, 36 pages, U.S. Appl. No. 14/579,776, filed Dec. 22, 2014.

Office Action dated Aug. 1, 2016, 6 pages, U.S. Appl. No. 14/579,776, filed Dec. 22, 2014.

Notice of Allowance dated Sep. 28, 2016, 5 pages, U.S. Appl. No. 14/579,776, filed Dec. 22, 2014.

* cited by examiner

SYSTEM AND METHOD FOR WAVELENGTH CONVERSION AND SWITCHING

CROSS-REFERENCE TO RELATED APPLICATIONS

This application is a continuation application of U.S. patent application Ser. No. 14/579,776 file on Dec. 22, 2014 by Futurewei Technologies, Inc. and titled "System and Method for Wavelength Conversion and Switching," which is a continuation application of U.S. patent application Ser. No. 12/042,933 filed on Mar. 5, 2008 by Young Lee, et al., and titled "System and Method for Wavelength Conversion and Switching," which claims priority to U.S. provisional application No. 60/940,892 filed on May 30, 2007 by Young Lee, et al., and titled "System and Method for Wavelength Conversion and Switching," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g., at the individual NEs, than existing optical networks.

One of the challenges in implementing WDM networks is the determination of the routing and wavelength assignment (RWA) for the various signals that are being transported through the network at any given time. Unlike traditional circuit-switched and connection-oriented packet-switched networks that merely have to determine a route for the data stream across the network, WDM networks are burdened with the additional constraint of having to ensure that the same wavelength is not simultaneously used by two signals over a single fiber. This constraint is compounded by the fact that WDM networks typically use specific optical bands comprising a finite number of usable optical wavelengths. As such, the RWA continues to be one of the challenges in implementing WDM technology in optical networks.

SUMMARY

In one embodiment, the disclosure includes a network component comprising at least one processor configured to implement a method comprising collecting wavelength availability information associated with a WSON, receiving a path computation request to transport a signal through the WSON, calculating at least one route through the WSON for the signal, and assigning at least one wavelength for the signal to use along the route.

In another embodiment, the disclosure includes a network comprising a first path computation element (PCE) configured to compute at least one route for a signal between a source and a destination, and a second PCE in communication with the first PCE, wherein the second PCE is configured to receive the route from the first PCE and assign at least one wavelength to the route.

In yet another embodiment, the disclosure includes a network comprising a PCE configured to compute at least one route for a signal between a source and a destination, and a plurality of NEs in communication with the PCE, wherein at least some of the NEs are configured to receive the route from the PCE, assign at least one wavelength to the route, and transport the signal between the source and the destination using the route and the wavelength.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for determining the RWA in WDM networks, such as the WSON. In one embodiment, a PCE receives RWA requests from a plurality of NEs, determines the RWA for the incoming signals, and communicates the RWA to the NEs. In another embodiment, the routing and wavelength assignment functions are performed by two separate PCEs. In a third embodiment, the PCE performs the routing assignment function, and the individual NEs are responsible for the wavelength assignment function. In any of these embodiments, the request may comprise sufficient wavelength information associated with the NEs to allow the RWA solution to be determined.

Figure 1:
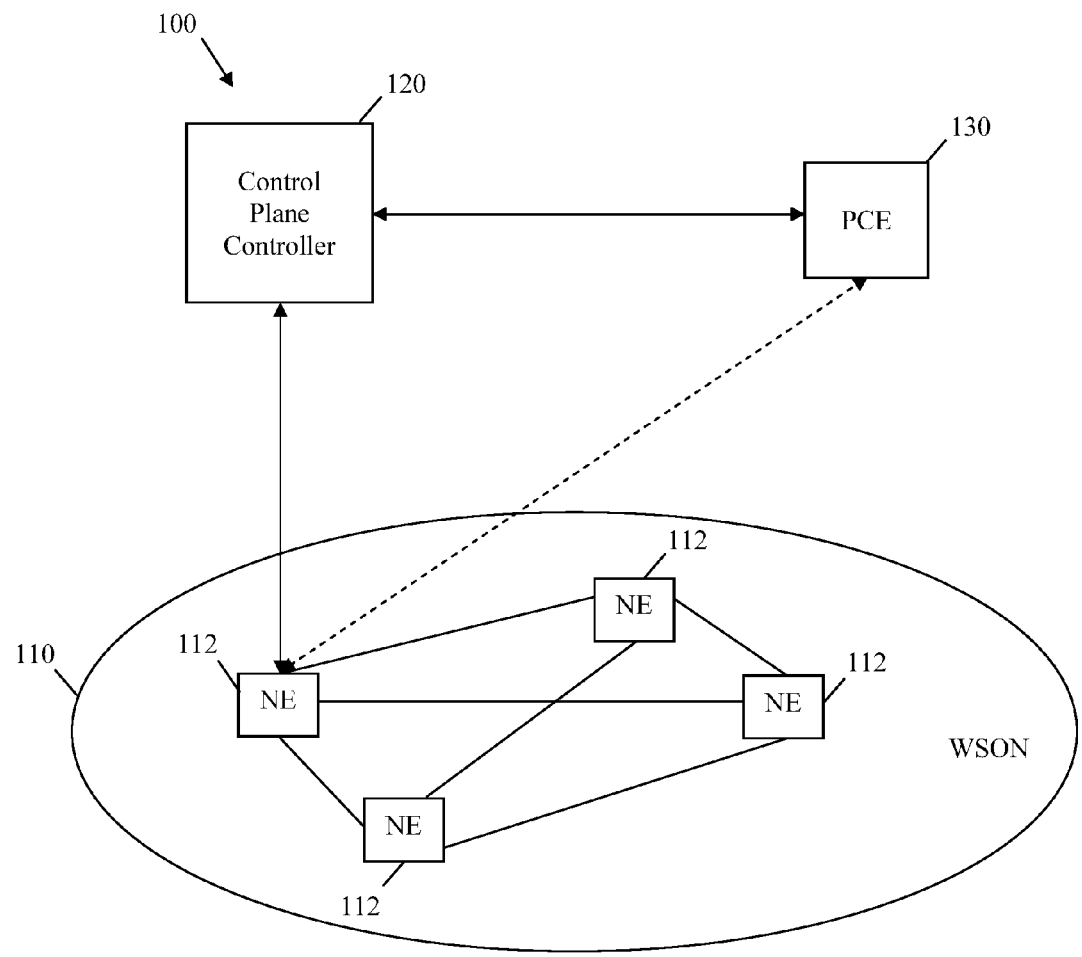
FIG. 1 is a schematic diagram of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any number of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network. For example, the WSON 110 may comprise optical cross connects (OXC), photonic cross-connects (PXC), reconfigurable optical add/drop multiplexers (ROADM), wavelength selective switches (WSS), optical add/drop multiplexers (OADM), and so forth.

The control plane controller 120 may coordinate activities within the WSON 110. Specifically, the control plane controller 120 may receive optical connection requests and provide lightpath signaling to the WSON 110 via Generalized Multi-Protocol Label Switching (GMPLS), thereby coordinating the NEs 112 such that data signals are routed through the WSON 110 with little or no contention. In addition, the control plane controller 120 may communicate with the PCE 130 using PCE protocol (PCEP) to provide the PCE 130 with information that may be used for the RWA, and/or receive the RWA from the PCE 130 and forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive the wavelength or other information that may be used for the RWA from the control plane controller 120, from the WSON 110, or both. The PCE may process the information to obtain the RWA, for example, by computing the routes, e.g., lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

The NEs 112 may be coupled to each other via optical fibers. The optical fibers may be used to establish optical links and transport the optical signals between the NEs 112. The optical fibers may comprise standard single mode fibers (SMFs) as defined in International Telecommunication Union Telecommunication Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The WDM links may operate in one or more optical bands. The optical bands may comprise an original band (O-band), an extended band (E-band), a short band (S-band), a conventional band (C-band), a long band (L-band), an ultra-long band (U-band), or combinations thereof. The O-band may comprise optical wavelengths from about 1260 nanometer (nm) to about 1360 nm and have a bandwidth equal to about 17.5 Terahertz (THz). The E-band may comprise optical wavelengths from about 1360 nm to about 1460 nm and have a bandwidth equal to about 15.1 THz. The S-band may comprise optical wavelengths from about 1460 nm to about 1530 nm and have a bandwidth equal to about 9.4 THz. The C-band may comprise optical wavelengths from about 1530 nm to about 1565 nm and have a bandwidth equal to about 4.4 THz. The L-band may comprise optical wavelengths from about 1565 nm to about 1625 nm and have a bandwidth equal to about 7.1 THz. The U-band may comprise optical wavelengths from about 1625 nm to about 1675 nm and have a bandwidth equal to about 5.5 THz. In some embodiments, not all of a particular band may be usable. For example, there may be attenuation due to a water absorption peak at about 1383 nm in many fibers that support E-band. Hence, there can be a discontinuous acceptable wavelength range for a particular link. In addition, some systems will utilize more than one band. This is particularly true for CWDM systems.

Moreover, the optical fibers may comprise different bandwidth capacities spanning the optical bands. The bandwidth capacities of the optical fibers may determine the number of wavelengths or wavelength channels that may be used to transport the individual WDM signals. For example, the SMF may comprise a bandwidth capacity centered at about 193.1 THz and comprising about 4800 channels that are separated at about 12.5 gigahertz (GHz). Alternatively, the SMF may comprise a bandwidth capacity at about 193.1 THz center frequency and comprising fewer than 4800 channels, which may be separated by about 25 GHz, about 50 GHz, about 100 GHz, or other multiples of about 100 GHz. Such wavelength channels may be used to transport individual DWDM signals. The SMF may also comprise a bandwidth capacity from about 1271 nm to about 1611 nm and about 18 channels separated by about 20 nm wavelength spacing, which can be used to transport individual CWDM signals.

The information sent to the PCE 130 may include information related to the established WDM links. Such information may include GMPLS labels that map the wavelengths or wavelength channels associated with the WDM links. The labels may map the individual wavelengths using a global network map that may be accessed by the PCE 130, the control plane controller 120, at least some of the components of the WSON 110, or combinations thereof. Mapping the wavelengths using the global network map may simplify the characterization of the WDM links and the NEs 112, and improve the communication between the WSON 110, the control plane controller 120, and the PCE 130.

The labels may indicate the wavelength ranges and channel spacing used in the WSON 110. Specifically, the information may include a 32-bit field that designates the total number of wavelength channels, which may be used to transport the WDM signals in the optical fibers. The 32-bit field may be sufficient to map as many DWDM or CWDM signals as permitted in the optical fiber. The information may also include a wavelength range field associated with each established WDM link between the NEs 112. The wavelength range field may comprise two 32-bit fields that comprise two labels that may map the first wavelength and the last wavelength in wavelength ranges used to transport the individual WDM links. The wavelength ranges used to transport the individual WDM links may be chosen to avoid assigning some undesirable wavelengths or wavelength ranges to transport the individual WDM links. The undesirable wavelengths or wavelength ranges may be different in different SMFs where the transported WDM signals may suffer considerable losses, attenuation, dispersion, or other undesirable changes in the signals. Additionally, the information may include a channel spacing field associated with each established WDM link. The channel spacing field may comprise labels that may map the channel spacing specified in the optical fibers to transport the WDM signals. For example, the channel spacing field may comprise a label that specifies about 12.5 GHz, about 25 GHz, about 50 GHz, about 100 GHz, or about 200 GHz channel spacing for DWDM links, or about 20 nm channel spacing for CWDM links. In some embodiments, the GMPLS may combine the fields comprising the wavelength information for the established WDM links into a bit-map field. The bit-map field may be small and used in the system 100 to indicate the wavelengths available for wavelength switching in the WSON 110. In an embodiment, the bit-map field may comprise about one bit for each wavelength.

The NEs 112 may be any WSON 110 component that receives, transports, processes, or transmits optical signals. As such, the NEs 112 may comprise optical transmitters that may transmit analog or digital optical signals at specific wavelengths. The optical transmitters may be lasers that transmit at a fixed wavelength or may be tunable lasers that transmit at any wavelength within a predetermined range. The optical transmitters may have different spectral characteristics comprising different modulation formats and bit rates. For example, the optical signals transmitted by the optical transmitters may be continuous digital signals that are transmitted from about 622 Megabit per second (Mbit/s) to about 1.25 Gigabit per second (Gbit/s) using a non-return to zero (NRZ) optical modulation format. Alternatively, the optical signals may be continuous digital signals that are transmitted from about 9.9 Gbit/s to about 43.02 Gbit/s using a return to zero (RZ) optical modulation format.

The NEs 112 may also comprise different tunable optical transmitters that may transmit the optical signals at a plurality of wavelengths, which may be selected from different ranges of wavelengths or frequencies, referred to as tuning ranges. The different tunable optical transmitters may also have different tuning times. The tuning times may depend on the tuning technology used by the tunable laser transmitters.

For example, a tunable optical transmitter that uses a thermal drift based tuning technology may have a tuning time of about a few seconds. On the other hand, a tunable optical transmitter that uses electronic tuning technology may have a tuning time at about less than one millisecond.

The information sent to the PCE 130 may include information related to the optical transmitters. Such information may include a field associated with each of the optical transmitters that indicates whether the optical transmitter may generate a digital or an analog signal. The GMPLS Interior Gateway Protocol-Traffic Engineering (IGP-TE), a flooding mechanism, or some other mechanism may also provide the PCE 130 with other fields that may indicate the bandwidth parameters, such as 3-decibel (dB) parameters for the analog signals, or the modulation format and bit rate for the digital signals. The allocated fields may provide information needed by the PCE 130 to compute the lightpaths for optical signal routing. Specifically, the information may be used for constraining the PCE 130 lightpath computation based on the compatibility of the signals with some of the established WDM links or with spectral properties of some elements or NEs 112 in the WSON 110. In addition, the information may include a tunable information field associated with each optical transmitter that may be set to indicate whether the optical transmitter is a tunable optical transmitter instead of a fixed laser transmitter. Furthermore, the information may include a tuning range field associated with each optical transmitter to specify the tuning range of the tunable optical transmitter. Specifically, the tuning range field may comprise two fields comprising labels that may indicate the first wavelength and the last wavelength (or the first frequency and the last frequency) representing the lower bound and the upper bound, respectively, of the tuning range. Finally, the information may include a tuning time field associated with the tuning time of the optical transmitter.

Some of the NEs 112 may comprise reconfigurable add/drop optical multiplexers (ROADMs). The ROADMs may be used for wavelength based switching by adding, dropping, or both adding and dropping any or all of the wavelengths that are used to transmit the optical signals. The wavelength based switching may be achieved using a variety of switching technologies including microelectromechanical systems (MEMS), liquid crystals, thermo-optic and beam-steering switches in planar waveguide circuits, tunable optical filter technologies, or combinations thereof. The ROADMs may comprise a plurality of line side ingress ports, line side egress ports, add ingress ports, drop egress ports, or combinations thereof. The add ingress ports and drop egress ports may also be called tributary ports. The optical signals handled by these various ports may comprise one or a plurality of optical wavelengths. The line side ingress ports may receive the optical signals and send some or all of the optical signals to the line side egress ports, which may in turn transmit the optical signals. Alternatively, the line side ingress ports may redirect some or all of the optical signals to the drop egress ports, which may drop the optical signals, for example, by transmitting the optical signals outside the optical fibers. The add ingress port may receive additional optical signals and send the optical signals to some of the line side egress ports, which may in turn transmit the optical signals.

The line side ingress ports, line side egress ports, drop egress ports, and drop ingress ports may be connected to each other in different connection configurations that may be changed or reconfigured. The connection configuration between the different ports in the ROADM may be represented using a connectivity matrix. The connectivity matrix may comprise a table comprising rows that are each associated with one of the line side ingress ports and the add ingress ports, and columns that are each associated with one of the line side egress ports and the drop egress ports. Each cell in the connectivity table may represent the current connection status between one of the ingress ports and one of the egress ports. When the ingress port associated with the row of the cell is connected with the egress port associated with the column of the cell, the cell may be set equal to one indicating an active connection between the two ports. Alternatively, when the ingress port associated with the row of the cell is not connected with the egress port associated with the column of the cell, the cell may be set equal to zero. The connectivity table may be dynamic where the values of the cells may change to reflect any changes in the connection configuration in the ROADM.

The number of line side ingress and line side egress ports may determine the degree of the ROADM. For example, a ROADM that comprises one line side ingress port and one line side egress port may have a degree of two. A ROADM that comprises more than one line side ingress port or more than one line side egress port may have a degree greater than two, and may also be an optical cross-connect (OXC) switch. Such OXCs may be asymmetrical in that they have a different number of line side ingress ports than line side egress ports. The connections between the ingress ports and the egress ports of the OXC may be represented by the connectivity matrix or by the complement of the connectivity matrix. The ROADMs and OXCs may comprise at least one colored port that may be an ingress port or an egress port, which may receive or transmit, respectively, the optical signal at a fixed optical wavelength or wavelength channel. The ROADMs and OXCs may also comprise at least one colorless port, which may be an ingress port or an egress port, which may receive or transmit, respectively, the optical signal at any one of an arbitrary number of optical wavelengths or wavelength channels.

The NEs 112 may also comprise fixed add/drop optical multiplexers (FOADMs). The FOADMs may be used for wavelength based switching by adding, dropping, or both adding and dropping any or some of the wavelengths in a preset manner. Similar to the ROADMs, the FOADMs may comprise a plurality of line side ingress and line side egress ports, and a plurality of add ingress and drop egress ports. However, the line side ingress ports, line side egress ports, drop egress ports, and drop ingress ports may be connected to each other in the FOADM in a fixed connection configuration that may not be changed. The FOADMs may drop one or a plurality of specific optical wavelengths or wavelength channels received by the line side ingress port via one or a plurality of specific drop egress ports. Additionally, the FOADMs may add one or a plurality of optical wavelengths or wavelength channels transmitted by the line side egress via one or a plurality of specific add ingress ports. Since the connection configuration between the ingress ports and the egress ports of the FOADMs may not be changed, the connectivity matrix of the FOADMs may be a fixed matrix with constant cell values.

The NEs 112 may comprise splitters comprising a single ingress port and at least two egress ports. The ingress port of the splitter may receive the optical signals and split the optical signals into a plurality of copies that are each transmitted by one of the egress ports. Similar to the FOADMs, the ingress port of the splitters may be connected to each of the egress ports in a fixed connection configuration that may not be changed. Hence, the reflectivity matrix of the splitter may be a fixed matrix comprising a single row associated with the ingress port and a plurality of columns associated with the egress ports, and where the cell values are set equal to one.

The NEs 112 may comprise optical combiners comprising a plurality of ingress ports and a single egress port. The ingress ports of the combiner may receive a plurality of optical signals and combine the optical signals into a single signal that comprise copies of the optical signals and that may be transmitted by the egress port. Similar to the splitters, each of the ingress ports of the combiners may be connected to the egress ports in a fixed connection configuration that may not be changed. Hence, the reflectivity matrix of the combiner may be a fixed matrix comprising a plurality of rows associated with the ingress ports and a single column associated with the egress port, and where the cell values are set equal to one.

The information sent to the PCE 130 may include information related to the ROADMs, OXCs, FOADMs, splitters, and combiners. In an embodiment, the information may include at least two fields associated with each of the devices. The first field may comprise the connectivity matrix that represents the connection configuration of the device ports, as explained above. The second field may indicate whether the device is a wavelength reconfigurable device, such as a ROADM or an OXC, or a non-wavelength reconfigurable device such as a FOADM, a splitter, or a combiner. The information may also include additional fields that are associated with each port of each device in the network, which may indicate the wavelength restrictions for each of the ports. For example, the information may include a first field associated with each port that indicates the number of wavelengths (or frequencies) that may be received in the case of an ingress port, or transmitted in the case of an egress port. The information may also include a second field associated with each port that indicates the range of wavelengths (or frequencies) that may be received or transmitted in the case of an ingress or egress port, respectively. The information may also include a third field associated with each port that indicates the wavelength (or frequency) spacing within the range of wavelengths (or frequencies). The wavelength restrictions for each port may be obtained from the combined information in the three allocated fields comprising the number of wavelengths, the range of wavelengths, and the wavelength spacing within the range of wavelengths. The ports may be categorized based on the obtained wavelength restrictions. Specifically the ports may be categorized as comprising multiple wavelengths from a full range of wavelengths, a single wavelength that may be changed from the full range of wavelengths, a single fixed wavelength that may not be changed, or multiple wavelengths from a reduced range of wavelengths.

The NEs 112 may also comprise wavelength converters that may receive the optical signals transmitted at one optical wavelength and retransmit the optical signals at the same or another optical wavelength. In one embodiment, the wavelength converter may be an OEO converter. The OEO converter may comprise a regenerator coupled to a tunable optical transmitter. The OEO regenerator may comprise one of three different types of regenerators. The first type of regenerators, referred to as a $R_1$ regenerator, may receive and re-amplify the optical signals to eliminate or reduce attenuations and losses in the signals' strength. The second type of regenerators, referred to as a $R_2$ regenerator, may receive, reshape, and re-amplify the optical signals. The third type of regenerators, referred to as a $R_3$ regenerator, may receive, reshape, re-amplify, and retime the optical signals. The quality of the transmitted optical signal may be improved, in terms of higher signal to noise ratio (SNR), using the $R_3$ regenerator but may be more dependent on the modulation format and bit rate of the received optical signal, in comparison to the $R_2$ and the $R_1$ regenerators. On the other hand, the quality of the transmitted optical signal may be reduced using the $R_1$ regenerator, but may be less dependent on the modulation format and bit rate of the received optical signal, in comparison to the $R_2$ and the $R_3$ regenerator.

In another embodiment, the wavelength converter may be an optical device that may convert the wavelength of the optical signal using non-linear optical effects, which may be more difficult to implement than the OEO converter. For example, the non-linear optical effects of the optical device may place more restrictions on the process of wavelength conversion, such as limiting the range of optical wavelengths that may be converted. The NEs 112 may comprise OEO converters, optical device based wavelength converters, or combinations thereof.

The system 100 may comprise various combinations of the optical converters and other NEs 112, thereby providing different amounts of wavelength conversion capability. For example, the WSON 110 may comprise a relatively large number of OEO converters among the NEs 112 that provide the system 100 with a relatively large number of wavelength conversion options. Alternatively, the WSON 100 may comprise ROADMs that implement optical conversion. Such a configuration may provide the system 100 with a fewer wavelength conversion options than that of the OEO converters. Further in the alternative, the WSON 100 may also comprise FOADMs, instead of ROADMs or OEO converters, which provide the system 100 with even more limited amount of wavelength conversion. If desired, conversion via FOADMs may be used as part of the lightpath routing. Finally, the system 100 may implement combinations of the above components.

The information sent to the PCE 130 may include information related to the optical converters. The optical converters can be associated with the NEs 112. As such, the information may include a field indicating whether the NE 112 has full wavelength conversion capability, e.g., any ingress wavelength to any egress wavelength, or limited wavelength conversion capability. The limited wavelength capability may indicate that the egress wavelength is dependent on the ingress wavelength, the ingress wavelength is dependent on the egress wavelength, the ingress port is dependent on the egress port, the egress port is dependent on the ingress port, or combinations thereof The information may also include an indication of whether the optical converter has a wavelength restriction that is dependent on the ingress wavelength, the egress wavelength, or combinations thereof. Furthermore, the information may include a plurality of fields that indicate the wavelength restrictions based on the modulation format and transmission speed associated with each of the OEO converters. Specifically, the information may include a first field that indicates the input optical wavelengths (or frequencies) or ranges of wavelengths (or frequencies) that may be received by the OEO converter. The information may include a second field that indicates the output optical wavelengths (or frequencies) or ranges of wavelengths (or frequencies) that may be transmitted by the OEO converter. The information may include a third field that indicates the regeneration level of the OEO converter, e.g., $R_1$, $R_2$, or $R_3$. The information may include a fourth field that indicates signal restrictions, in terms of modulation formats and bit rates that may be associated with the $R_2$ or the $R_3$ regenerator.

In an embodiment, the WSON 110 may comprise wavelength converters that may be shared by different NEs 112 or components in the network to convert the wavelengths of the optical signals along a plurality of lightpaths. In such a case, the information field may include an information field comprising the number of available shared wavelength converters. The field may indicate the wavelength conversion capability of the network and may be added to the RWA information. The information may also include additional fields comprising labels that map the available wavelengths used by the available wavelength converters for signal transmission.

In some embodiments, the RWA information may be sent to the PCE 130 by a path computation client (PCC). The PCC may be any client application requesting a path computation to be performed by the PCE 130. The PCC may also be any network component that makes such a request, such as the control plane controller 120, or any NE 112, such as a ROADM or a FOADM.

In some embodiments, the information sent to the PCE 130 may include temporal restrictions associated with the data signal. The temporal restrictions may be classified by type, timeliness, duration, or combinations thereof. The type may refer to whether the transport requests are received in batches, e.g., concurrently, or sequentially. The lightpath connection timeliness may comprise one of three options that may be associated with the lightpaths: a time critical frame, a soft time bound, or a scheduled or advanced reservation. The time critical frame may be assigned for lightpaths that are used for restoration of network services or for other high priority real time service requests. The soft time bound may be assigned for lightpaths that are used for new or first-time connection requests. The soft time bound may be assigned for the first-time connection requests to allow for additional time that can be used for network optimization. The scheduled or advanced reservation may be assigned for lightpaths that are used for services requested prior to receipt of the signal. The lightpath connection duration may also comprise one of three options that may be associated with the lightpaths: a dynamic time frame, a pseudo-static time frame, and a static time frame. The dynamic time frame may be assigned to lightpaths that have relatively short duration. The pseudo-static time frame may be assigned to lightpaths that have moderately longer duration than those assigned the dynamic time frame. The static time frame may be assigned to lightpaths that have relatively long duration.

The computation of the RWA may be dependent on the network topology. For example, RWA is relatively easy in WSONs 110 in which every NE 112 is wavelength selective in that it has a tunable laser and a wavelength converter. In such a case, path selection is similar to the MPLS and TDM circuit switched cases with full time slot interchange capability in that the wavelengths have only local significance. Thus, the routing problem needs to be addressed only at the level of the traffic engineered (TE) link choice, and wavelength assignment can be resolved locally by the switches on a hop-by-hop basis. In contrast, WSONs 110 with no wavelength converters have the wavelength continuity restraint. Specifically, such WSONs 110 require each lightpath or optical channel (OCh) to have a route from its source to its destination that uses a single wavelength that does not collide with the wavelengths used by any other lightpath that may share an optical fiber. To reduce this constraint while keeping network costs reduced, a limited number of wavelength converters may be introduced at certain points in the network.

The RWA problem requires certain inputs to produce the desired outputs. The inputs to the RWA problem may include the data signal's source and destination, the network topology, the locations and capabilities of any wavelength converters, and the wavelengths available on each optical link. The RWA inputs may also include any of the aforementioned information, which may be embodied as GMPLS labels. Once the RWA inputs are obtained, the RWA problem may be solved using any suitable method. The different RWA algorithms may be selected based on the service provider's needs, such as network optimization, network restoration, and highly dynamic lightpath provisioning requirements. The output from the algorithm solving the RWA problem is at least one specific route through the WSON 110, and at least one wavelength associated with the route. In the case where multiple wavelengths are provided, the RWA solution provides an explicit route through ROADMs, a wavelength for the optical transmitter, and a set of locations (generally associated with ROADMs or switches) where wavelength conversion is to occur, and the new wavelength to be used on each component link after that point in the route.

Routing assignments may be computed using any suitable assignment technique. For example, open shortest path first (OSPF) or OSPF traffic engineering (OSPF-TE) may be used to assign the routes to the incoming signals. Similarly, various methods may be used to assign the wavelengths. In one embodiment, the PCE 130 may implement an algorithm that assigns random and available optical wavelengths for the computed lightpaths. In another embodiment, the PCE 130 may implement an algorithm that assigns the first available optical wavelengths from an ordered list of available wavelengths. In a third embodiment, the PCE 130 may implement an algorithm that assigns the most used optical wavelengths in the network to the computed lightpaths. In a multi-fiber network where a plurality of fibers may connect two NEs 112, the PCE 130 may use a least-loaded approach in which it assigns optical wavelengths to the links that connect each two NEs 112 along the lightpath so that as few fibers as possible are used between the two NEs 112. If desired, the routing assignment may produce multiple routes so that the assignment of wavelengths is less constrained. In such a case, the PCE 130 may select a single route and assign wavelengths to that route.

The RWA information may be either static or dynamic. Static RWA information changes only when there is a change in the network hardware, for example, when a component fails or a new component is added. Dynamic RWA information can change when the lightpath provisioning changes. The timeliness in which an entity involved in the RWA process is notified of such changes may be situational. For example, for network restoration purposes, learning of a hardware failure or of new hardware coming online to provide restoration capability can be important in realizing the full capacity of the network. The scaling of dynamic information may be improved by using incremental updates and/or tailoring message content to the WSON, for example, the use of wavelength ranges or wavelength occupation bit maps.

The RWA information may be sent to the PCE 130 using various protocols. For example, the RWA information may be sent using existing control plane or routing protocols such as GMPLS. Alternatively, the RWA information may be sent using existing management protocols, such as NetConf, simple network management protocol (SNMP), command line interface (CLI), or common object request broker architecture (CORBA). Further in the alternative, the RWA information may be sent using directory services and accompanying protocols. In cases where the number of PCEs 130 is significantly less than number of NEs 112, flooding may be avoided by messaging directly between the NEs 112 and the PCE 130. Finally, the RWA information may be sent using extensible markup language (XML).

Figure 2:
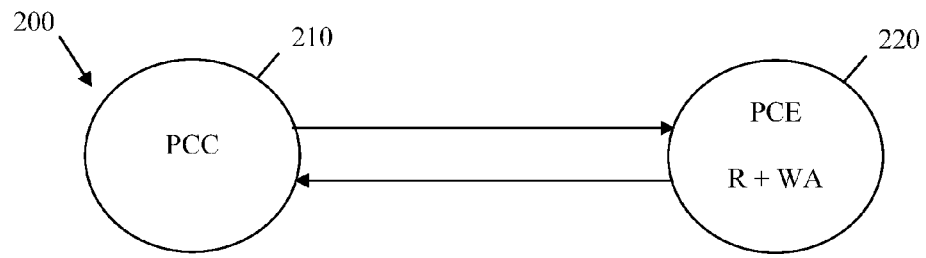
FIG. 2 is a schematic diagram of an embodiment of a PCE architecture.

FIG. 2 illustrates an embodiment of a combined RWA architecture 200. In the combined RWA architecture 200, the PCC 210 communicates the RWA request and the required information to the PCE 220, which implements both the routing function and the wavelength assignment function using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information about the NEs and the network topology is provided. The combined RWA architecture 200 may be preferable for network optimization, smaller WSONs, or both.

Figure 3:
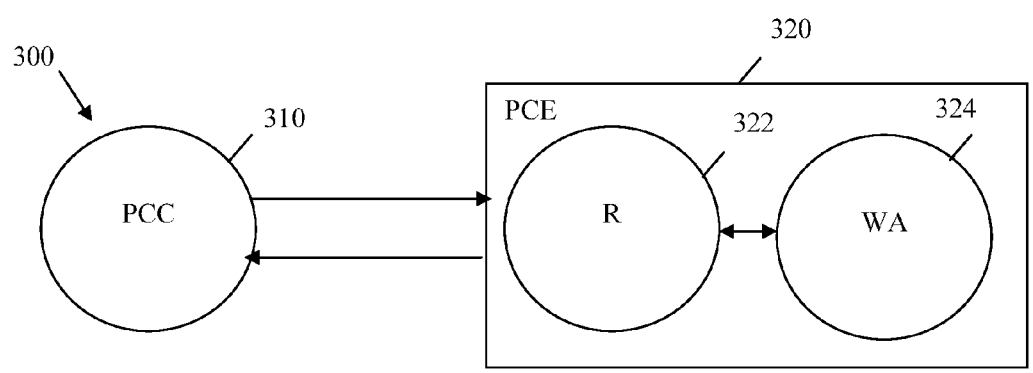
FIG. 3 is a schematic diagram of another embodiment of the PCE architecture.

FIG. 3 illustrates an embodiment of a separate RWA architecture 300. In the separate RWA architecture 300, the PCC 310 communicates the RWA request and the required information to the PCE 320, which implements both the routing function and the wavelength assignment function using separate computation entities, such as processors 322 and 324. Alternatively, the separate RWA architecture 300 may comprise two separate PCEs 320 each comprising one of the processors 322 and 324. Implementing signal routing and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath route and forward the route to the processor 324 where the wavelength assignment is preformed. The RWA may then be passed back to the processor 322 and then to the PCC 310. Such an embodiment may also be reversed such that the PCC 310 communicates with the processor 324 instead of the processor 322.

In either architecture 200 or 300, the NE initiating the signaling may receive a route from the source to destination along with the wavelengths, e.g., GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
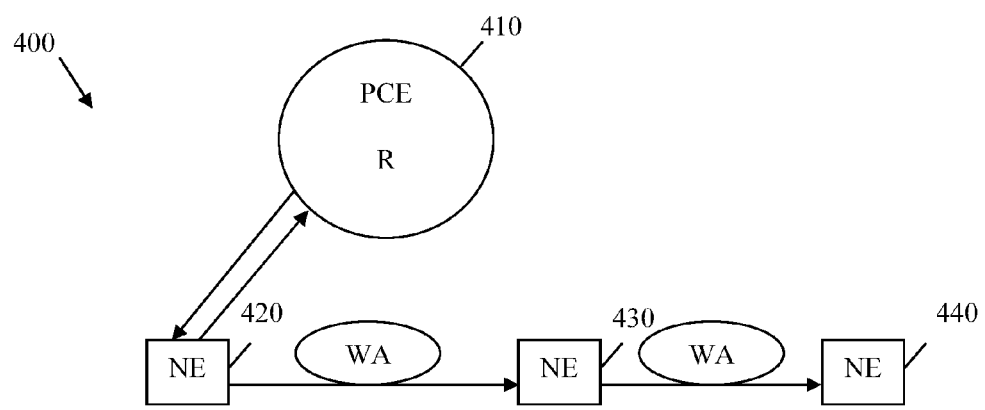
FIG. 4 is a schematic diagram of another embodiment of the PCE architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing function. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

In some embodiments of the distributed wavelength assignment, the lightpath will be unidirectional and may not contain any converters. In such a case, the wavelengths for the individual links may be assigned using GMPLS signaling between the NEs, e.g., along a unidirectional lightpath or label switched path (LSP). The GMPLS signaling may comprise forwarding a resource reservation protocol-traffic engineering (RSVP-TE) path message that comprise a label set object between the NEs. The label set object may comprise all the labels that map the available wavelengths in the links between the NEs. The label set object may be processed to obtain the common available wavelengths in the links between the NEs. If the NEs do not contain any wavelength converters, a single wavelength may be obtained from the available wavelengths and is assigned to each link in the LSP. The single wavelength may be obtained by implementing an algorithm that may choose one wavelength from the available wavelengths or the first wavelength in the list of available wavelengths. The one wavelength may be randomly selected or may be the first wavelength that fits the required criteria. Alternatively, the algorithm may choose the most used wavelength among the available wavelengths by analyzing any global wavelength information in the network, which may be passed between the NEs via the GMPLS signaling. Alternatively, the algorithm may choose the wavelength that is least used in comparison to the other available wavelengths. In multi-fiber networks, the algorithm may choose the least used wavelength by analyzing GMPLS information about the use of wavelengths in each link between the NEs.

In other embodiments of the distributed wavelength assignment, the lightpath will be unidirectional and may contain some converters. When wavelength converters are present, the NEs with wavelength converters need to make a determination as to whether to perform a wavelength conversion. One indicator for this would be that the set of available wavelengths which is obtained via the intersection of the incoming label set and the egress links available wavelengths is either null or deemed too small to permit successful completion. At this point, the NE would need to remember that it will apply wavelength conversion and will be responsible for assigning the wavelength on the previous wavelength-contiguous segment when the RSVP-TE reserve (RESV) message passes by. In such a case, the NE may pass on an enlarged label set reflecting only the limitations of the wavelength converter and the egress link. The record route option in RSVP-TE signaling can be used to show where wavelength conversion has taken place.

In yet other embodiments of the distributed wavelength assignment, the lightpath will be bidirectional and may not contain any converters. In such a case, the aforementioned procedures may be used to determine the available bidirectional wavelength, for example by creating a label set that is available in both directions. If the bidirectional LSPs setup is indicated by the presence of an upstream label in the path message, the upstream label information may not be available until the intersection of the available label sets is obtained at the destination NE and the wavelength assignment algorithm has been obtained.

The above procedures may be implemented using existing GMPLS signaling. Basic support for WSON signaling already exists in GMPLS with the wavelength (value 9) LSP encoding type, or the G.709 Optical Channels (value=13) LSP encoding type. As described above, wavelengths and signals may be identified using a global mapping between wavelengths and labels. Alternatively, link management protocol (LMP) may be used to assign the map for each link then convey that information to any path computation entities, e.g., label switch routers or stand-alone PCEs. The local label map approach may require the label-set contents in the RSVP-TE Path message to be translated every time the map changes between an incoming link and the outgoing link. In such a case, traffic parameters for wavelength LSPs may be defined, including a signal type field that includes modulation format and/or rate information.

GMPLS routing defines an interface capability descriptor for lambda switch capable (LSC), which can be used to describe the interfaces on a ROADM or other type of wavelength selective switch. In addition to the topology information typically conveyed via an Interior Gateway Protocol (IGP), other subsystem properties may need to be included to characterize a WSON. For example, these properties may include WDM link properties such as the allowed wavelengths, laser transmitter properties such as the wavelength ranges, ROADM, and/or FOADM properties including a connectivity matrix and any port wavelength restrictions, and the wavelength converter properties, which may be identified per network element and may change if a common limited shared pool is used. In some cases, the WDM link properties and the laser transmitter properties may be combined with the ROADM and/or FOADM properties. Such information may be relatively static, except for the number of wavelength converters that are available in a shared pool.

In some embodiments, the link bandwidth information may be dynamic. In such cases, there may be a need for wavelength-specific availability information. Even if the number of available wavelengths on a link is known, it may be desirable to know the available and occupied wavelengths prior to implementing the aforementioned a combined RWA or separate routing and wavelength assignment processes. Such may not be possible with current GMPLS routing extensions. However, in the routing extensions for GMPLS, requirements for layer-specific TE attributes are discussed. The RWA problem for optical networks without wavelength converters imposes an additional requirement for the wavelength (or optical channel) layer: knowing which specific wavelengths are in use. Current DWDM systems range from about 16 channels to about 128 channels with advanced laboratory systems having up to about 300 channels. Given these channel limitations, representing the use of wavelengths via a simple bit-map, e.g., one bit per wavelength or other information field, is feasible. In the GMPLS extensions for OSPF, the interface capability descriptor sub-type/length/value (TLV) contains a subfield comprising switching capability specific information and is one possible place for a bit map of available wavelengths.

However, current GMPLS routing extensions do not provide enough information for the solution of the RWA problem.

In the combined RWA and separate routing and WA architectures, the WSON information conveyed via GMPLS routing may be static or dynamic and may be associated with either a link or a NE. Table 1 summarizes some of these relationships, and may represent the information sent to the TED in the PCE:

TABLE 1

| Information | Static/Dynamic | NE/Link |
| --- | --- | --- |
| Connectivity matrix | Static | NE |
| Per port wavelength restrictions | Static | NE |
| WDM link (fiber) wavelength ranges | Static | Link |
| WDM link channel spacing | Static | Link |
| Laser transmitter range | Static | Link |
| Wavelength conversion capabilities | Static | NE |
| Maximum bandwidth per wavelength | Static | Link |
| Wavelength availability | Dynamic | Link |

It may be noted that the per port wavelength restrictions are the per port wavelength restrictions for an optical device, such as a ROADM, and are independent of any optical constraints imposed by a fiber link. Furthermore, the laser transmitter range could be viewed as a NE's capability. In addition, the wavelength conversion capability could be dynamic in the case of a limited pool of converters where the quantity available can change with connection establishment. Moreover, the wavelength conversion may include regeneration capabilities because OEO converters are also regenerators. Finally, the wavelength availability may not be needed in the case of distributed wavelength assignment via signaling.

In the distributed WA architecture, the WSON information may be more limited. Table 2 summarizes the WSON information that may be conveyed via GMPLS in such an embodiment:

TABLE 2

| Information | Static/Dynamic | NE/Link |
| --- | --- | --- |
| Connectivity matrix | Static | NE |
| Wavelength conversion capabilities | Static | NE |

The distributed WA architecture may implement these signaling extensions substantially as described above.

The PCE may support WSON-enabled RWA computation with protocol enhancement as the PCEP defines the procedures necessary to support both sequential and global concurrent path computations. As such, the implications for PCE may be classified as lightpath constraints and characteristics, and computation architectures. As for the lightpath constraints and characteristics, the lightpath requests may be bulk and sequential. Specifically, the PCE may receive a batch optimization where multiple lightpaths requested at one time, a simultaneous request for a lightpath(s) and backup lightpath(s), or just a single lightpath request. PCEP and PCE-global concurrent optimization (GCO) can be readily enhanced to support any of these instances. In addition, the request may include lightpath constraints, such as a bidirectional assignment of wavelengths, a simultaneous assignment of wavelength to primary and backup paths, or a tuning range constraint on an optical transmitter. These lightpath characteristics can include duration information that indicates how long this connection may last and/or timeliness/urgency information that indicates how quickly the connection needed.

The algorithms and network information needed for solving the RWA are somewhat specialized and computationally intensive, thus not all PCEs within a domain may need or want such capability. As such, RWA capable PCEs may be discovered using any available procedure. For example, the PCE discovery mechanisms may be used to indicate whether the PCE has the ability to compute the RWA problem. Specifically, a sub-TLV could be allocated for this purpose. Objective functions in PCE may allow the operators to request differing objective functions per their need and applications. For instance, this would allow the operator to choose an objective function that minimizes the total network cost associated with setting up a set of paths concurrently. This would also allow operators to choose an objective function that results in a most evenly distributed link utilization. This implies that PCEP would easily accommodate wavelength selection algorithm in its objective function to be able to optimize the path computation from the perspective of wavelength assignment if chosen by the operators.

Figure 5:
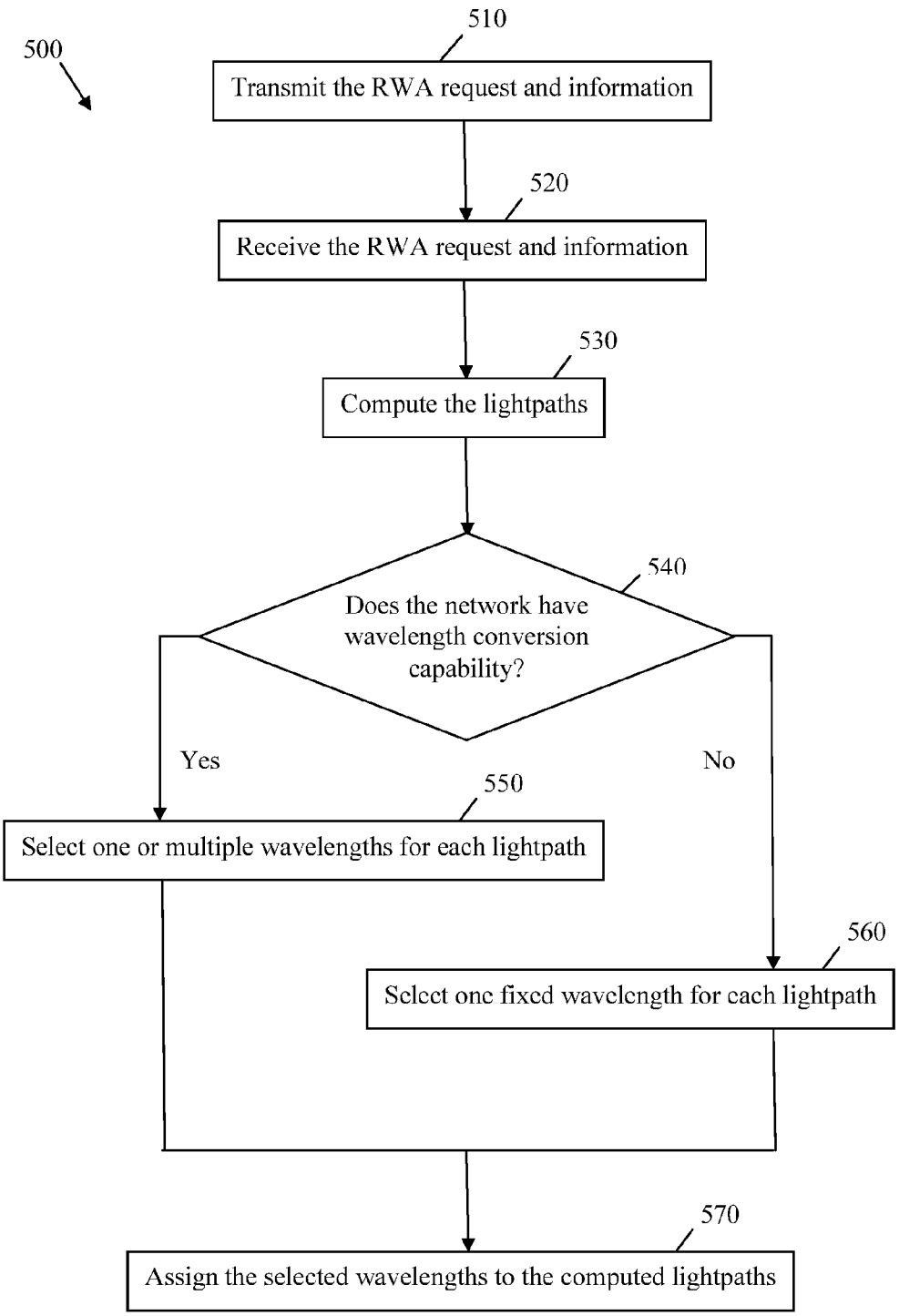
FIG. 5 is a flowchart of an embodiment of an RWA method.

FIG. 5 illustrates one embodiment of a RWA method 500. The method 500 may be implemented using one of the PCE architectures 200, 300, or 400. At block 510, the method 500 may comprise sending an RWA request and the RWA information associated with the WSON from a network entity, such as an NE or a PCC. At block 520, the method 500 may comprise receiving the RWA request and the RWA information at another network entity, such as a PCE. At block 530, the method 500 may comprise computing the lightpaths that may be used for signal routing in the network using the RWA information. At block 540, the method 500 may comprise verifying whether the network may comprise wavelength conversion capability. Specifically, the method 500 may comprise analyzing the RWA information to discover the presence of wavelength converters in the network. The method 500 may proceed to block 550 when the condition at block 540 is met, for example, when the network comprises some wavelength converters. At block 550, the method 500 may comprise selecting one or a plurality of available wavelengths for each of the computed lightpaths using the wavelength availability information and the wavelength conversion capability included in the RWA information, as explained above. Alternatively, the method 500 may proceed to block 560 when the condition at block 540 is not met. At block 560, the method 500 may comprise selecting a single available wavelength for each of the computed lightpaths using the wavelength availability information. The method 500 may proceed after block 550 and block 560 to block 570. At block 570, the method 500 may comprise assigning the selected wavelength or plurality of wavelengths to each computed lightpath.

In another embodiment, the method 500 may comprise verifying whether the network may comprise wavelength conversion capability at block 540 before computing the lightpaths at block 530. The method 500 may then combine block 530 with block 550 and block 570 to compute the lightpaths and assign one or a plurality of wavelengths to each lightpath simultaneously, when the condition at block 540 is met. Otherwise, the method 500 may comprise combining block 530 with block 560 and block 570 to compute the lightpaths and assign fixed wavelengths to each lightpath simultaneously, when the condition at block 540 is not met.

Figure 6:
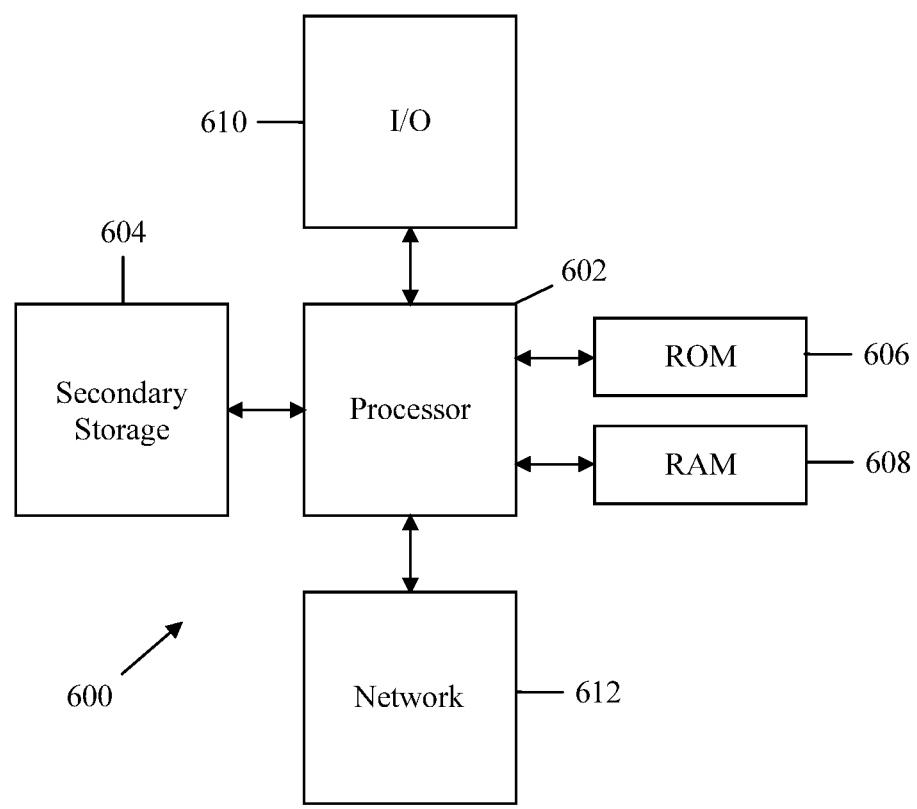
FIG. 6 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A path computation element (PCE) for an optical network, the PCE comprising:
   a receiver configured to:
      receive, from a first network node in the optical network, first information comprising a first connectivity matrix and per port wavelength restrictions of the first network node, wherein the first connectivity matrix represents a connection configuration between first ingress ports and first egress ports for the first network node; and
      receive, from a second network node in the optical network, second information comprising a second connectivity matrix and per port wavelength restrictions of the second network node, wherein the second connectivity matrix represents a connection configuration between second ingress ports and second egress ports for the second network node; and
   a processor coupled to the receiver and configured to compute a lightpath through the optical network using the first information and the second information.

2. The PCE of claim 1, wherein the receiver is further configured to:
   receive the first information directly from the first network node; and
   receive the second information directly from the second network node.

3. The PCE of claim 2, wherein the receiver is further configured to receive a path computation request from a path computation client (PCC).

4. The PCE of claim 3, wherein the processor is further configured to further compute the lightpath in response to the path computation request.

5. The PCE of claim 4, wherein the processor is further configured to generate, in response to the path computation request, a path computation reply indicating the lightpath.

6. The PCE of claim 5, further comprising a transmitter coupled to the processor and configured to transmit the path computation reply to the PCC.

7. The PCE of claim 1, further comprising a TE database (TED) coupled to the processor and configured to store the first information and the second information.

8. The PCE of claim 1, wherein the first information further comprises wavelength conversion capability of the first network node, and wherein the second information further comprises wavelength conversion capability of the second network node.

9. The PCE of claim 1, wherein the first connectivity matrix comprises a first table, and wherein the first table comprises first rows associated with the first ingress ports, first columns associated with the first egress ports, and first cells representing current connection statuses between the first ingress ports and the first egress ports.

10. A method implemented by a path computation element (PCE) for an optical network, the method comprising:
    receiving, from a first network node in the optical network, first information comprising a first connectivity matrix and per port wavelength restrictions of the first network node, wherein the first connectivity matrix represents a connection configuration between first ingress ports and first egress ports for the first network node; and
    receiving, from a second network node in the optical network, second information comprising a second connectivity matrix and per port wavelength restrictions of the second network node, wherein the second connectivity matrix represents a connection configuration between second ingress ports and second egress ports for the second network node.

11. The method of claim 10, further comprising:
    receiving a path computation request from a path computation client (PCC); and
    computing, in response to the path computation request, a lightpath through the optical network using the first information and the second information.

12. The method of claim 11, further comprising:
    generating, in response to the path computation request, a path computation reply indicating the lightpath; and
    transmitting the path computation reply to the PCC.

13. The method of claim 12, wherein the receiving the first information comprises receiving the first information directly from the first network node, and wherein the receiving the second information comprises receiving the second information directly from the second network node.

14. The method of claim 10, further comprising storing the first information and the second information in a TE database (TED).

15. The method of claim 10, wherein the first information further comprises wavelength conversion capability of the first network node, and wherein the second information further comprises wavelength conversion capability of the second network node.

16. The method of claim 10, wherein the first connectivity matrix comprises a first table, and wherein the first table comprises first rows associated with the first ingress ports, first columns associated with the first egress ports, and first cells representing current connection statuses between the first ingress ports and the first egress ports.

17. A network node in an optical network, the network node comprising:
a plurality of ingress ports;
a plurality of egress ports;
a processor coupled to the plurality of ingress ports and the plurality of egress ports and configured to:
generate first information comprising a connectivity matrix and per port wavelength restrictions of the network node, wherein the connectivity matrix represents a connection configuration between the plurality of ingress ports and the plurality of egress ports; and
a transmitter coupled to the processor and configured to transmit the first information towards a path computation element (PCE).

18. The network node of claim 17, wherein the transmitter is configured to transmit the first information directly to the PCE.

19. The network node of claim 18, wherein the transmitter is configured to transmit a path computation request to the PCE, wherein the network node comprises a receiver configured to receive a path computation reply from the PCE, wherein the path computation reply indicates a lightpath through the optical network that is computed using the first information and second information from a second network node, wherein the second information comprises a second connectivity matrix representing a connection configuration between second ingress ports of the second network node and second egress ports of the second network node.

* * * * *

UNITED STATES PATENT AND TRADEMARK OFFICE
CERTIFICATE OF CORRECTION

| | | |
|---|---|---|
| PATENT NO. | : 10,341,747 B2 | Page 1 of 1 |
| APPLICATION NO. | : 15/401553 | |
| DATED | : July 2, 2019 | |
| INVENTOR(S) | : Young Lee et al. | |

It is certified that error appears in the above-identified patent and that said Letters Patent is hereby corrected as shown below:

On the Title Page

Page 3, Other Publications, first column, Lines 43-45, should read:
Bernstein, G. et al., "Routing and Wavelength Assignment Information for Wavelength Switched Optical Networks," draft-bernstein-ccamp-wson-info-02.txt, Feb. 20, 2008, 48 pages.

In the Specification

Column 1, Lines 8-19, should read:
This application is a continuation application of U.S. patent application Ser. No. 14/579,776 filed on Dec. 22, 2014 by Futurewei Technologies, Inc. and titled "System and Method for Wavelength Conversion and Switching," which is a continuation application of U.S. patent application Ser. No. 12/042,933 filed on Mar. 5, 2008 by Young Lee, et al., and titled "System and Method for Wavelength Conversion and Switching," which claims priority to U.S. provisional application No. 60/940,892 filed on May 30, 2007 by Young Lee, et al., and titled "System and Method for Wavelength Conversion and Switching," which are incorporated by reference.

Signed and Sealed this
Tenth Day of September, 2019

Andrei Iancu
*Director of the United States Patent and Trademark Office*